United States Patent
Nowell et al.

(10) Patent No.: US 11,675,509 B2
(45) Date of Patent: Jun. 13, 2023

(54) MULTIPLE OPEN BLOCK FAMILIES SUPPORTING MULTIPLE CURSORS OF A MEMORY DEVICE

(71) Applicant: MICRON TECHNOLOGY, INC., Boise, ID (US)

(72) Inventors: Shane Nowell, Boise, ID (US); Michael Sheperek, Longmont, CO (US); Larry J Koudele, Erie, CO (US); Bruce A Liikanen, Berthoud, CO (US); Steve Kientz, Westminster, CO (US)

(73) Assignee: Micron Technology, Inc., Boise, ID (US)

( * ) Notice: Subject to any disclaimer, the term of this patent is extended or adjusted under 35 U.S.C. 154(b) by 65 days.

(21) Appl. No.: 17/084,540

(22) Filed: Oct. 29, 2020

(65) Prior Publication Data
US 2022/0137814 A1    May 5, 2022

(51) Int. Cl.
*G06F 3/06*    (2006.01)

(52) U.S. Cl.
CPC ............ *G06F 3/064* (2013.01); *G06F 3/0604* (2013.01); *G06F 3/0688* (2013.01)

(58) Field of Classification Search
None
See application file for complete search history.

(56) References Cited

U.S. PATENT DOCUMENTS

| | | |
|---|---|---|
| 7,162,604 B1 * | 1/2007 | Nourmohamadian ....................... G06F 3/0686 711/111 |
| 2010/0131697 A1 | 5/2010 | Alrod et al. |
| 2016/0147444 A1 | 5/2016 | Neerman et al. |
| 2017/0041394 A1 * | 2/2017 | Mortazavi ............ G06F 3/0607 |
| 2017/0255403 A1 * | 9/2017 | Sharon ................. G11C 16/26 |
| 2017/0271031 A1 | 9/2017 | Sharon et al. |
| 2018/0090213 A1 | 3/2018 | Peterson et al. |
| 2019/0179741 A1 | 6/2019 | Liu |
| 2020/0097189 A1 * | 3/2020 | Tao ..................... G11C 16/26 |
| 2021/0311879 A1 * | 10/2021 | Kang ..................... G06F 12/10 |

OTHER PUBLICATIONS

PCT International Search Report and Written Opinion for International Application No. PCT/US2021/057121, dated Feb. 17, 2022, 9 pages.

* cited by examiner

*Primary Examiner* — Stephanie Wu
(74) *Attorney, Agent, or Firm* — Lowenstein Sandler LLP

(57) ABSTRACT

An example memory sub-system includes a memory device and a processing device, operatively coupled to the memory device. The processing device is configured to open a first block family associated with the memory device; assign a first cursor of a plurality of cursors of the memory device to the first block family; responsive to programming a first block associated with the first cursor, associate the first block with the first block family; open, while the first block family is open, a second block family associated with the memory device; assign a second cursor of the plurality of cursors of the memory device to the second block family; and responsive to programming a second block associated with the second cursor, associate the second block with the second block family.

14 Claims, 12 Drawing Sheets

FIG. 7

SuperBlock Table 710

| SuperBlock | Partition | Time Hr | Temp | Family |
|---|---|---|---|---|
| 0 | 0 | 10 | 31 | 4 |
| 0 | 1 | 11 | 35 | 5 |
| 0 | 2 | 11 | 50 | 20 |
| ... | ... | ... | ... | ... |
| 0 | 31 | | | 20 |
| 1 | 0 | | | 21 |
| 1 | 1 | | | 0 |
| 1 | 2 | | | 0 |
| 1 | 3 | | | 0 |
| ... | ... | | | ... |
| 1 | 30 | | | 1 |
| 1 | 31 | | | 1 |
| ... | ... | ... | ... | ... |
| 745 | 29 | | | 22 |
| 745 | 30 | | | 0 |
| 745 | 31 | | | 0 |

Family Table 720

| Index | Die 0 bin | Die 1 bin | ... | Die N bin |
|---|---|---|---|---|
| 1 | 5 | 6 | ... | 4 |
| 2 | 4 | 2 | 3 | 5 |
| 3 | | | | |
| 4 | | | | |
| 5 | | | | |
| ... | | | | |
| 20 | | | | |
| 21 | | | | |
| 22 | | | | |
| ... | | | | |
| 62 | | | | |
| 63 | | | | |
| 64 | | | | |

Offset table 730

| Bin | TLC 1 | TLC 2 | TLC 3 | TLC 4 | TLC 5 | TLC 6 | TLC 7 | MLC 1 | MLC 2 | MLC 3 | SLC |
|---|---|---|---|---|---|---|---|---|---|---|---|
| 1 | 0 | 1 | 1 | -1 | -2 | -3 | -4 | 0 | 2 | 2 | 1 |
| 2 | | | | | | | | | | | |
| 3 | | | | | | | | | | | |
| ... | | | | | | | | | | | |
| 64 | | | | | | | | | | | |

MULTIPLE OPEN BLOCK FAMILIES SUPPORTING MULTIPLE CURSORS OF A MEMORY DEVICE

TECHNICAL FIELD

Embodiments of the disclosure are generally related to memory sub-systems, and more specifically, are related to multiple block families supporting multiple cursors of a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

FIG. 7 schematically illustrates example metadata maintained by the memory sub-system controller for associating blocks and/or partitions with block families, in accordance with embodiments of the present disclosure.

DETAILED DESCRIPTION

Figure 1:
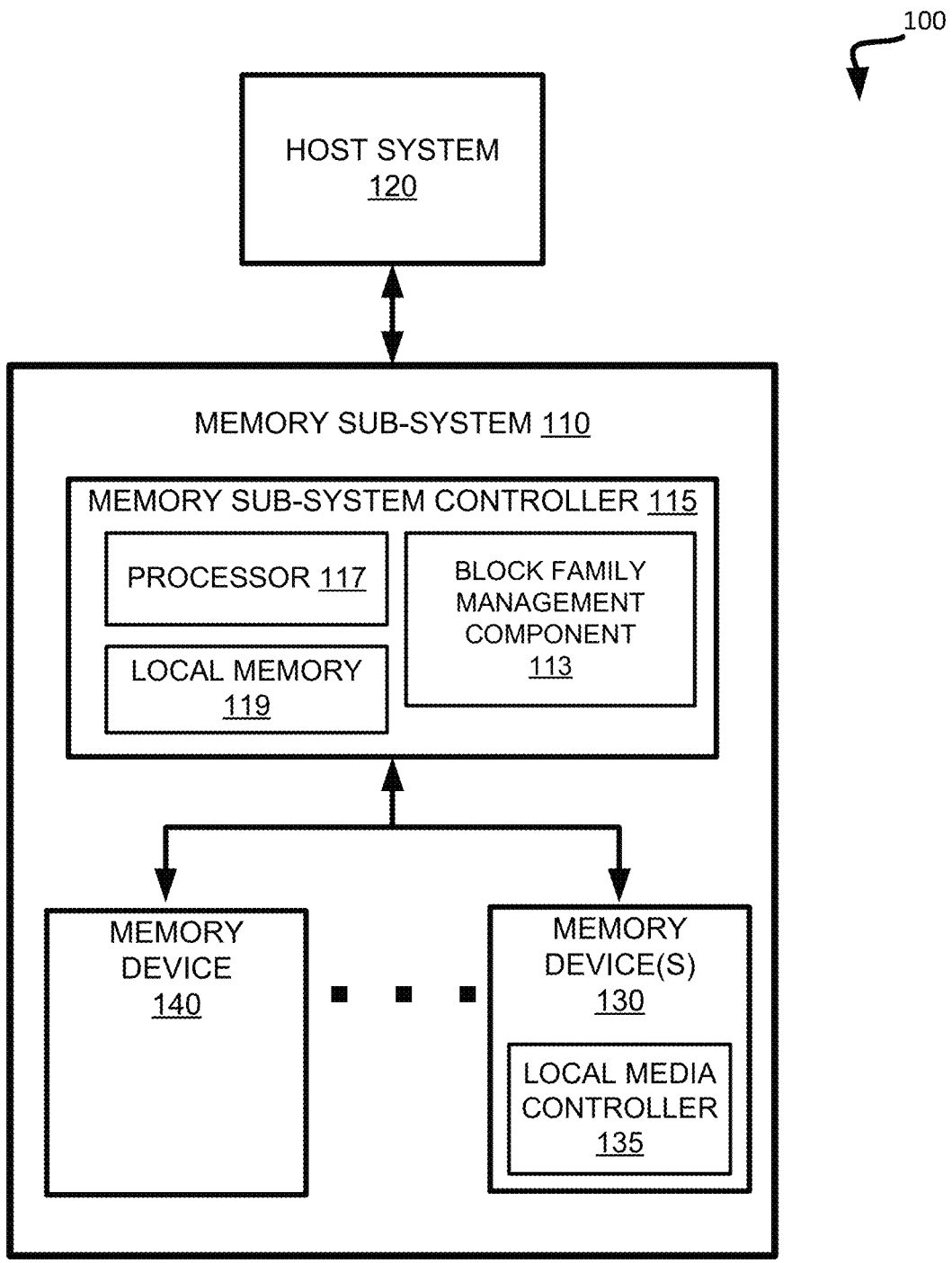
FIG. 1 illustrates an example computing system that includes a memory sub-system in accordance with some embodiments of the present disclosure.

Embodiments of the present disclosure are directed to supporting multiple open block families for assigning blocks from different cursors of different data streams of a memory device. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

A memory device includes multiple memory cells, each of which can store, depending on the memory cell type, one or more bits of information. A memory cell can be programmed (written to) by applying a certain voltage to the memory cell, which results in an electric charge being held by the memory cell, thus allowing modulation of the voltage distributions produced by the memory cell. Moreover, precisely controlling the amount of the electric charge stored by the memory cell allows to establish multiple threshold voltage levels corresponding to different logical levels, thus effectively allowing a single memory cell to store multiple bits of information: a memory cell operated with $2^n$ different threshold voltage levels is capable of storing n bits of information. "Threshold voltage" herein shall refer to the voltage level that defines a boundary between two neighboring voltage distributions corresponding to two logical levels. Thus, the read operation can be performed by comparing the measured voltage exhibited by the memory cell to one or more reference voltage levels in order to distinguish between two logical levels for single-level cells and between multiple logical levels for multi-level cells.

Due to the phenomenon known as slow charge loss, the threshold voltage of a memory cell changes in time as the electric charge of the cell is degrading, which is referred to as "temporal voltage shift" (since the degrading electric charge causes the voltage distributions to shift along the voltage axis towards lower voltage levels). The threshold voltage is changing rapidly at first (immediately after the memory cell was programmed), and then slows down in an approximately logarithmic linear fashion with respect to the time elapsed since the cell programming event. Accordingly, failure to mitigate the temporal voltage shift caused by the slow charge loss can result in the increased bit error rate in read operations.

However, various common implementations either fail to adequately address the temporal voltage shift or employ inefficient strategies resulting in high bit error rates and/or exhibiting other shortcomings. Embodiments of the present disclosure address the above-noted and other deficiencies by implementing a memory sub-system that employs block family based error avoidance strategies, thus significantly improving the bit error rate exhibited by the memory sub-system. In accordance with embodiments of the present disclosure, the temporal voltage shift is selectively tracked for programmed blocks grouped by block families, and appropriate voltage offsets, which are based on block affiliation with a certain block family, are applied to the base read levels in order to perform read operations. "Block family" herein shall refer to a set of blocks that have been programmed within a specified time window and a specified temperature window. Since the time elapsed after programming and temperature are the main factors affecting the temporal voltage shift, all blocks and/or partitions within a single block family are presumed to exhibit similar distributions of threshold voltages in memory cells, and thus would require the same voltage offsets to be applied to the base read levels for read operations. "Base read level" herein shall refer to the initial threshold voltage level exhibited by the memory cell immediately after programming. In some implementations, base read levels can be stored in the metadata of the memory device.

Block families can be created asynchronously with respect to block programming events. In an illustrative example, a new block family can be created whenever a specified period of time (e.g., a predetermined number of minutes) has elapsed since creation of the last block family or the reference temperature of memory cells has changed by more than a specified threshold value. The memory sub-system controller can maintain an identifier of the open block family, which is associated with one or more blocks as they are being programmed.

The memory sub-system controller can periodically perform a calibration process in order to associate each die of every block family with one of the predefined threshold voltage offset bins, which is in turn associated with the voltage offset to be applied for read operations. The associations of blocks with block families and block families and dies with threshold voltage offset bins can be stored in respective metadata tables maintained by the memory sub-system controller.

To program a block family, the memory sub-system controller can associate a cursor to blocks of an open block family. "Cursor" herein shall broadly refer to one or more locations on the memory device to which data items of one or more data streams are being written. The host system may group, into multiple data streams, the data to be written to the memory sub-system, such that each data stream would contain data items belonging to the same group of associated data (e.g., data associated with a single data structure, such as a file or a database; data produced by an execution thread or a process running on the host; or data produced by a particular host from a group of hosts associated with the memory sub-system). Thus, the data items contained by a single data stream may share one or more characteristics, such as workload characteristics (e.g., frequency and/or transfer length of read and write operations), expected garbage collection characteristics of the data stream (e.g., the frequency of the re-write operations, causing garbage collection), host-expected performance characteristics (e.g., read and/or write latency requirements), etc. "Data item" refers to an atomic unit of data that is written to and/or read from a memory device of the memory sub-system. For example, a "data item" may refer to a data block or to a key-value pair. A "data block" is a group of data of a given size (e.g., 4K of data, 128K of data) sent to a memory sub-system (e.g., SSD) by the host system.

A cursor can be maintained by a hardware device (e.g., the memory sub-system controller) and firmware associated with the hardware device. The memory sub-system controller can determine a maximum number of cursors that can be tracked at a given time, while the firmware can decide how many cursors of the maximum number of cursors to utilize at a given time. As such, the memory sub-system controller can utilize and track multiple cursors simultaneously, which allows to support multiple data programming threads simultaneously. In an illustrative example, a separate cursor may be associated with each data stream specified by the metadata of write commands issued by the host. A memory sub-system controller can, therefore, program multiple blocks in parallel by utilizing multiple cursors.

More specifically, the present disclosure provides the ability to support multiple open block families, such that each block family is associated with one or more cursors of the memory sub-system based on workload characteristics, performance characteristics, and/or garbage collection characteristics of data streams associated with the respective cursors. In accordance with embodiments of the present disclosure, a cursor associated with a given data stream of the memory sub-system can be assigned to an open block family of the memory sub-system. Each data stream can have a set of characteristics (e.g., performance characteristics, workload characteristics, garbage collection characteristics, etc.) that can differ from one data stream to another. Accordingly, data blocks associated with one data stream can have similar read/write requirements and thus can be assigned to the same block family. On the other hand, data blocks associated with different data streams can have different read/write and performance requirements and thus assigning them to the same block family can result in miscalibration of at least some of the data blocks. The set of characteristics associated with a data stream can be workload characteristics, expected garbage collection characteristics of the data stream, host-expected performance characteristics, or a combination thereof, as explained in more details below.

In an embodiment, a block that is being programmed can be assigned to the block family that is associated with the cursor associated with the block. Another open cursor can be assigned to the same open block family if the characteristics of the respective data streams associated with the two cursors are similar. Based on the similarity of characteristics, blocks of the two cursor are likely to have similar threshold voltage offsets and experience similar temporal voltage shifts, and thus the same calibration process of the block family can be applied to blocks from either data stream, therefore justifying the assignment to the same block family of the two cursors associated with respective data streams.

On the other hand, if two data streams associated with respective open cursors are substantially different (e.g., have different workload requirements, different garbage collection requirements, and/or different performance requirements), the two cursors can be assigned to two different block families. In certain embodiments, the number of open block families within the memory sub-system can be determined based on the available space of the memory device that is used for storing the metadata associated with the block families, as explained in more details herein below.

In certain embodiments, each open block family can have an expected lifetime, such that the block family can be closed when a timeout that had been set at the block family creation expires. The expected lifetime of a block family can be determined based on the performance requirements of the data stream associated with the block family, the temperature of the memory device of the data stream, a degree of wear of the memory device of the data stream, and/or other environment and workload variables.

In certain embodiments, two block families can be combined together to free memory space available for storing block families and to simplify managing block families within the memory sub-system. In one embodiment, two block families that are associated with the same set of cursors can be combined together since they are likely to have similar threshold voltage offsets and to experience similar temporal voltage shifts. Accordingly, in one embodiment, two block families that are associated with different sets of cursors can be precluded from being combined. In another embodiment, two block families that are associated with different sets of cursors can still be combined if the time elapsed since the creation of the block families exceeds a certain threshold. In this case, because block families associated with respective different data streams converge in characteristics as time passes, such block families can still be combined together when the block families have been created in the system for a time period that exceeds a certain threshold.

Therefore, advantages of the systems and methods implemented in accordance with some embodiments of the present disclosure include, but are not limited to, improving the bit error rate in read operations by maintaining metadata tracking groups of blocks (block families) that are presumed to exhibit similar voltage distributions. Additionally, the present disclosure enables the ability to maintain multiple open block families to support multiple cursors within the memory sub-system based on performance and workload characteristics of a data stream of each cursor. This approach helps eliminating a potential miss-calibration that can happen to at least some data blocks if cursors of different characteristics are assigned to one open block family. Additionally, since data at some cursors can be frequently overwritten, causing premature block family extinction through garbage collection, assigning those cursors to a dedicated block family can improve the overall performance of the memory sub-system because the other cursors can be assigned to a separate block family that will not have to end prematurely, thus eliminating the unnecessary increase in the number of block families that needs to be managed within the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

In some implementations, memory sub-system 110 can use a striping scheme, according to which every the data payload (e.g., user data) utilizes multiple dies of the memory devices 130 (e.g., NAND type flash memory devices), such that the payload is distributed through a subset of dies, while the remaining one or more dies are used to store the error correction information (e.g., parity bits). Accordingly, a set of blocks distributed across a set of dies of a memory device using a striping scheme is referred herein to as a "super-block."

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a block family management component 113, which can be used to implement techniques for enabling multiple open block families to support multiple cursors within memory sub-system 110, in accordance with embodiments of the present disclosure. In some embodiments, block family management component 113 can open a new block family responsive to closing the previously open block family. Block family management component 113 can then associate one or more cursors that are exhibiting similar characteristics. However, it can be desirable to assign data streams with substantially different characteristics to different block families. Thus, the block family management component 11333 can support multiple simultaneous open block families, which can help avoid miscalibration of at least some of the data blocks (e.g., threshold voltage offsets associated with the block family can optimal for some blocks and less optimal for other blocks). The set of characteristics associated with a data stream can be workload characteristics (e.g., frequency and/or transfer length of read and write operations), expected garbage collection characteristics of the data stream (e.g., the frequency of the re-write operations, causing garbage collection), host-expected performance characteristics (e.g., read and/or write latency requirements), or a combination thereof.

Subsequently, when a data block is programmed, block family management component 113 can assign the data block to the block family assigned to the cursor that is associated with the data block. When block family management component 113 detects another open cursor associated with another data stream, block family management component 113 can make a determination whether or not the second data stream has characteristics that are similar to the characteristics of the first data stream. For example, block family management component 113 can determine that the two characteristics are similar if a distance between two vector values corresponding to each of the characteristics does not exceed a certain threshold. If the second data stream has different characteristics than the first data stream (e.g., different workload requirements, different garbage collection requirements, and/or different performance requirements), block family management component 113 can assign the second cursor to another open block family. In this case, when a data block is programmed at the second cursor, block family management component 113 can assign the data block to the second block family. In certain implementations, block family management component 113 can maintain a limited number (e.g., not exceeding a certain threshold) of open block families. The threshold number of open block families can depend on the available memory in the memory sub-system: when the available space at memory device that is used for storing block families is below a threshold (e.g., less than 10% of the storage space of the memory device is available), block family management component 113 can allow a limited number of open block families in the system. On the other hand, when the available space at memory device used for storing block families is above the threshold (e.g., more than 10% of the storage space of the memory device is available), block family management component 113 can allow a larger number if block families to be open simultaneously within the memory sub-system.

On the other hand, if block family management component 113 determines that two data streams have substantially similar characteristics, block family management component 113 can assign their respective associated cursors to the same block family. In an illustrative example, block family management component 113 can determine that the two data streams has similar characteristics if a variance between the two characteristics does not exceed a predetermined threshold (e.g., if a distance between two vector values corresponding to each of the two characteristics does not exceed the predetermined threshold). Thus, block family management component 113 can assign to the same block family the data blocks belonging to either of the two cursors.

When block family management component 113 opens a new block family, block family management component 113 can assign timeout parameter to the block family to determine when to close the block family. For example, the timeout value can be initialized to a certain threshold (e.g., 15 minutes) at the time of opening the block family, and then can be decremented time elapses after opening the block family. When the timeout value expires, block family management component 113 can end the block family and open a new block family in the memory sub-system 110. As explained above, memory sub-system 110 can have multiple open block families simultaneously, such that cursors associated with data streams that have different characteristics can each be assigned to a different block family. In this case, a timeout value associated with a first block family can be different than another timeout value that is associated with another block family. The timeout value of each block family can be determined based on the performance requirements of the data stream associated with the block family, the temperature of the memory device of the data stream, a degree of wear of the memory device of the data stream, and/or other environment and workload variables.

In certain embodiments, block family management component 113 can combine two block families together (e.g., by merging blocks of a first block family into a second block family, then deleting the first block family from metadata tables of the memory sub-system). For example, block family management component 113 can combine block families together to free memory space available for storing block families and to simplify managing block families within the memory sub-system. In one embodiment, memory sub-system 110 can combine block families that are associated with the same set of cursors together, such that the combined block families are likely to have similar threshold voltage offsets. In another embodiment, block family management component 113 can also allow block families associated with different set of cursors together if if the time elapsed since the creation of the block families exceeds a certain threshold. In this case, because block families converge in characteristics as time passes, block family management component 113 can enable combining of two block families that support different data streams when the block families have been in existence for a significant period of time.

In one embodiment, block family management component 113 can assign a separate error handling module to each block family, such that each error handling module can be optimized for prioritizing the handling of certain errors, based on the characteristics of the data streams associated with the respective block family. In an illustrative example, a block family that is associated with a data stream that is often read can have an error handling module that prioritizes the detection and handling of read disturb errors. On the other hand, another block family that is associated with a data stream of a memory device that is operating at a high temperature can have an error handling module that prioritizes the detection and handling of data retention issues that can be caused by the high temperature.

Figure 2:
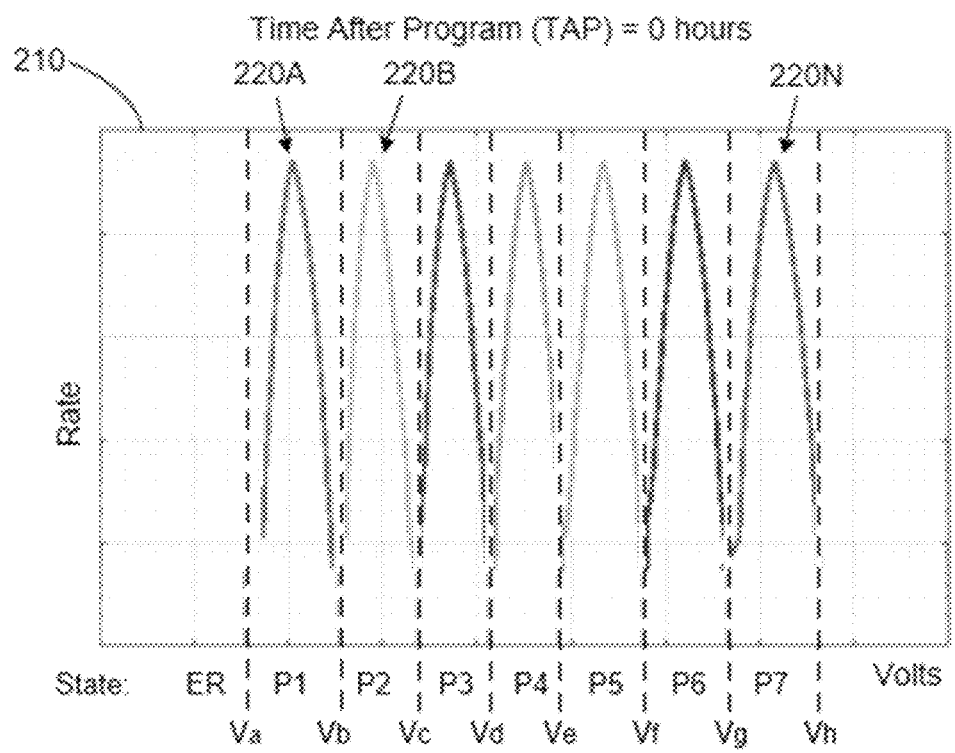
FIG. 2 schematically illustrates the temporal voltage shift caused by the slow charge loss exhibited by triple-level memory cells, in accordance with some embodiments of the present disclosure.
Figure 2:
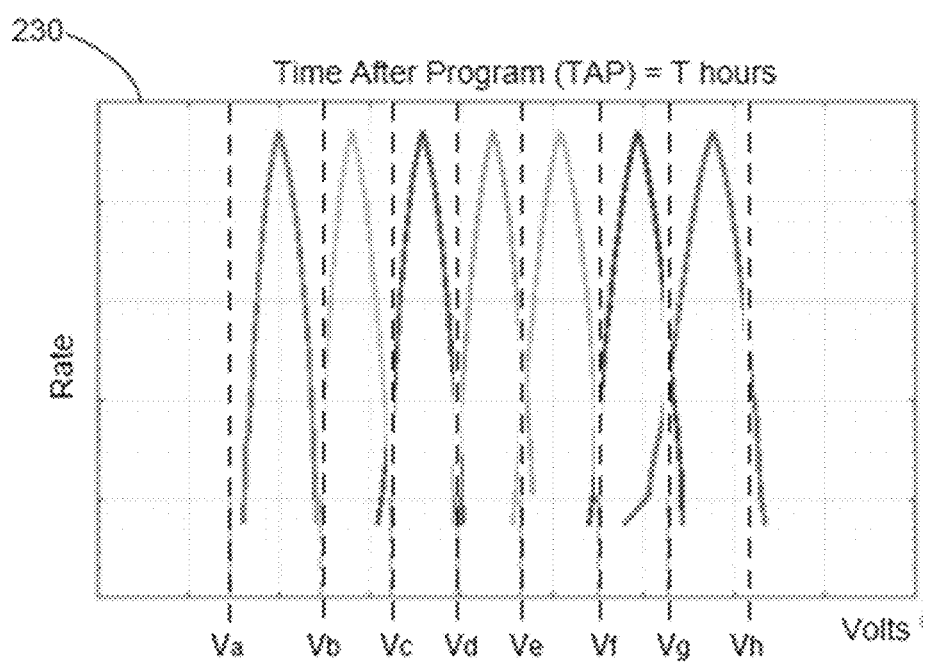

FIG. 2 illustrates the temporal voltage shift caused at least in part by the slow charge loss exhibited by triple-level memory cells, in accordance with embodiments of the disclosure. While the illustrative example of FIG. 2 utilizes triple-level cells, the same observations can be made and, accordingly, the same remedial measures are applicable to single level cells and any memory cells having multiple levels.

A memory cell can be programmed (written to) by applying a certain voltage (e.g. program voltage) to the memory cell, which results in an electric charge stored by the memory cell. Precisely controlling the amount of the electric charge stored by the memory cell allows a memory cell to have multiple threshold voltage levels that correspond to different logical levels, thus effectively allowing a single memory cell to store multiple bits of information. A memory cell operated with $2^n$ different threshold voltage levels is capable of storing n bits of information.

Each of chart 210 and 230 illustrate program voltage distributions 220A-420N (also referred to as "program distributions" or "voltage distributions" or "distributions" or "levels" herein) of memory cells programmed by a respective write level (which can be assumed to be at the midpoint of the program distribution) to encode a corresponding logical level. The program distributions 220A through 220N can illustrate the range of threshold voltages (e.g., normal distribution of threshold voltages) for memory cells programmed at respective write levels (e.g., program voltages). In order to distinguish between adjacent program distributions (corresponding to two different logical levels), the read threshold voltage levels (shown by dashed vertical lines) are defined, such that any measured voltage that falls below a read threshold level is associated with one program distribution of the pair of adjacent program distributions, while any measured voltage that is greater than or equal to the read threshold level is associated with another program distribution of the pair of neighboring distributions.

In chart 210, eight states of the memory cell are shown below corresponding program distributions (except for the state labeled ER, which is an erased state, for which a distribution is not shown). Each state corresponds to a logical level. The read threshold voltage levels are labeled Va-Vh. As shown, any measured voltage below Va is associated with the ER state. The states labeled P1, P2, P3, P4, P5, P6, and P7 correspond to distributions 22A-220N, respectively.

Time After Program (TAP) herein shall refer to the time since a cell has been written and is the primary driver of TVS (temporal voltage shift). TVS captures SCL as well as other charge loss mechanisms. TAP can be estimated (e.g., inference from a data state metric), or directly measured (e.g., from a controller clock). A cell, block, page, block family, etc. is young (or, comparatively, younger) if it has a (relatively) small TAP and is old (or, comparatively, older) if it has a (relatively) large TAP. A time slice is a duration between two TAP points during which a measurement can be made (e.g., perform reference calibration from X to Y minutes or hours after program). A time slice can be referenced by its center point.

As seen from comparing example charts 210 and 230, which reflect the time after programming (TAP) of 0 (immediately after programming) and the TAP of T hours (where T is a number of hours), respectively, the program distributions change over time due primarily to slow charge loss. In order to reduce the read bit error rate, the corresponding read threshold voltages are adjusted to compensate for the shift in program distributions, which are shown by dashed vertical lines. In various embodiments of the disclosure, the temporal voltage shift is selectively tracked for die groups based on measurements performed at one or more representative dice of the die group. Based on the measurements made on representative dice of a die group that characterize the temporal voltage shift and operational temperature of the dice of the die group, the read threshold voltage offsets used to read the memory cells for the dice of the die group are updated and are applied to the base read threshold levels to perform read operations.

Figure 3:
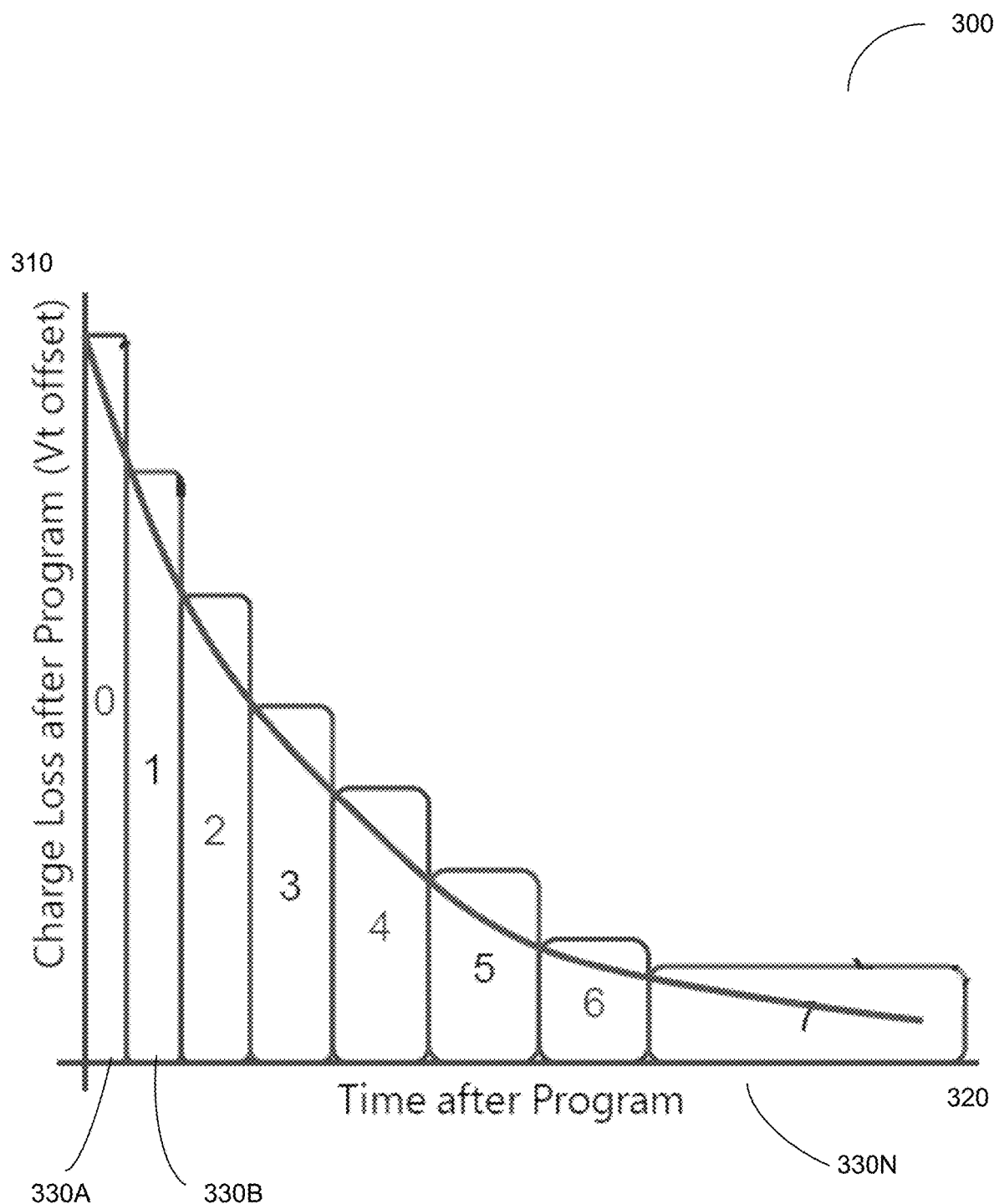
FIG. 3 depicts an example graph illustrating the dependency of the threshold voltage offset on the time after program (i.e., the period of time elapsed since the block had been programmed, in accordance with some embodiments of the present disclosure.

FIG. 3 depicts an example graph 300 illustrating the dependency of the threshold voltage offset 310 on the time after program 320 (i.e., the period of time elapsed since the block had been programmed. As schematically illustrated by FIG. 3, blocks of the memory device are grouped into block families 330A-330N, such that each block family includes one or more blocks that have been programmed within a specified time window and a specified temperature window. As noted herein above, since the time elapsed after programming and temperature are the main factors affecting the temporal voltage shift, all blocks and/or partitions within a single block family 310 are presumed to exhibit similar distributions of threshold voltages in memory cells, and thus would require the same voltage offsets for read operations.

Block families can be created asynchronously with respect to block programming events. In an illustrative example, the memory sub-system controller 115 of FIG. 1 can create a new block family whenever a specified period of time (e.g., a predetermined number of minutes) has elapsed since creation of the last block family or whenever the reference temperature of memory cells, which is updated at specified time intervals, has changed by more than a specified threshold value since creation of the current block family.

A newly created block family can be associated with bin 0. Then, the memory sub-system controller can periodically perform a calibration process in order to associate each die of every block family with one of the predefines threshold voltage offset bins (bins 0-7 in the illustrative example of FIG. 3), which is in turn associated with the voltage offset to be applied for read operations. The associations of blocks with block families and block families and dies with threshold voltage offset bins can be stored in respective metadata tables maintained by the memory sub-system controller.

Figure 4:
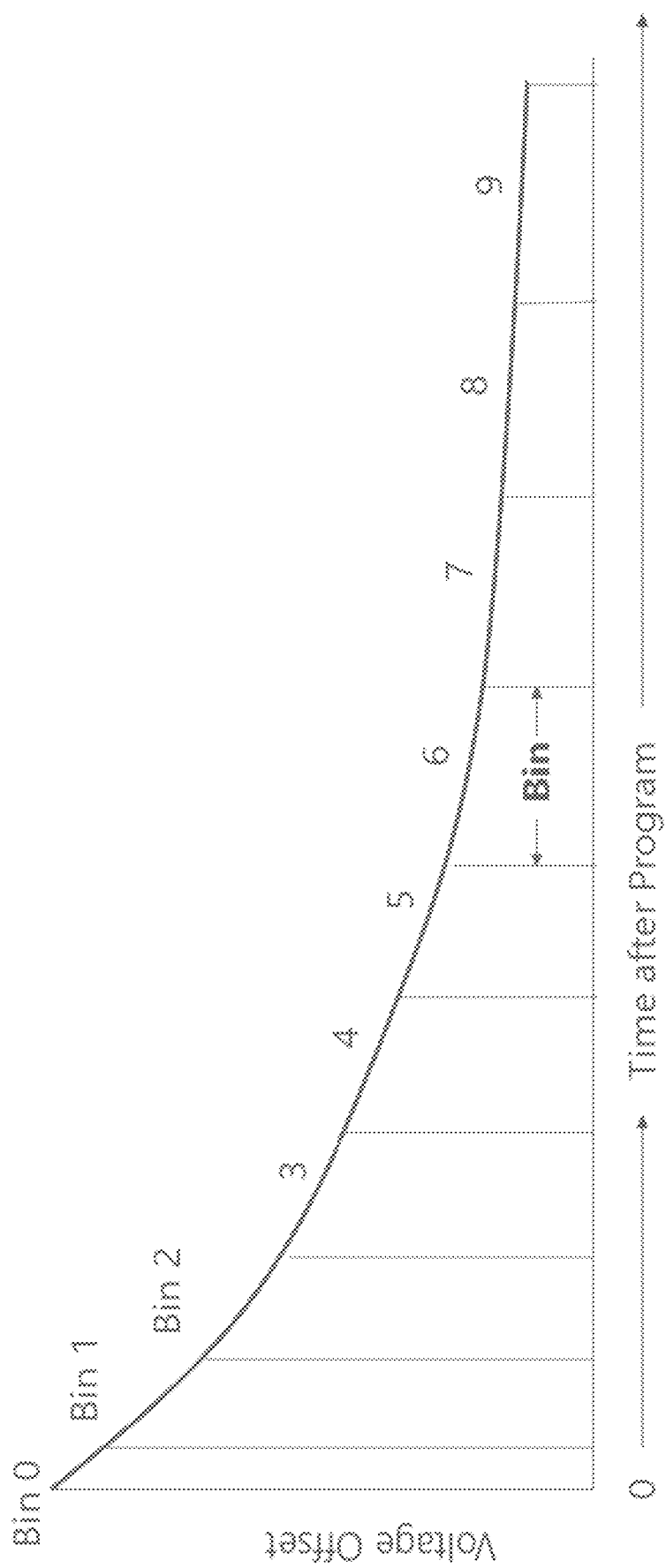
FIG. 4 schematically illustrates a set of predefined threshold voltage offset bins, in accordance with embodiments of the present disclosure.

FIG. 4 schematically illustrates a set of predefined threshold voltage offset bins (bin 0 to bin 9), in accordance with embodiments of the present disclosure. As schematically illustrated by FIG. 4, the threshold voltage offset graph can be subdivided into multiple threshold voltage offset bins, such that each bin corresponds to a predetermined range of threshold voltage offsets. While the illustrative example of FIG. 4 defines ten bins, in other implementations, various other numbers of bins can be employed (e.g., 64 bins). Based on a periodically performed calibration process, the memory sub-system controller associates each die of every block family with a threshold voltage offset bin, which defines a set of threshold voltage offsets to be applied to the base voltage read level in order to perform read operations, as described in more detail herein below.

Figure 5:
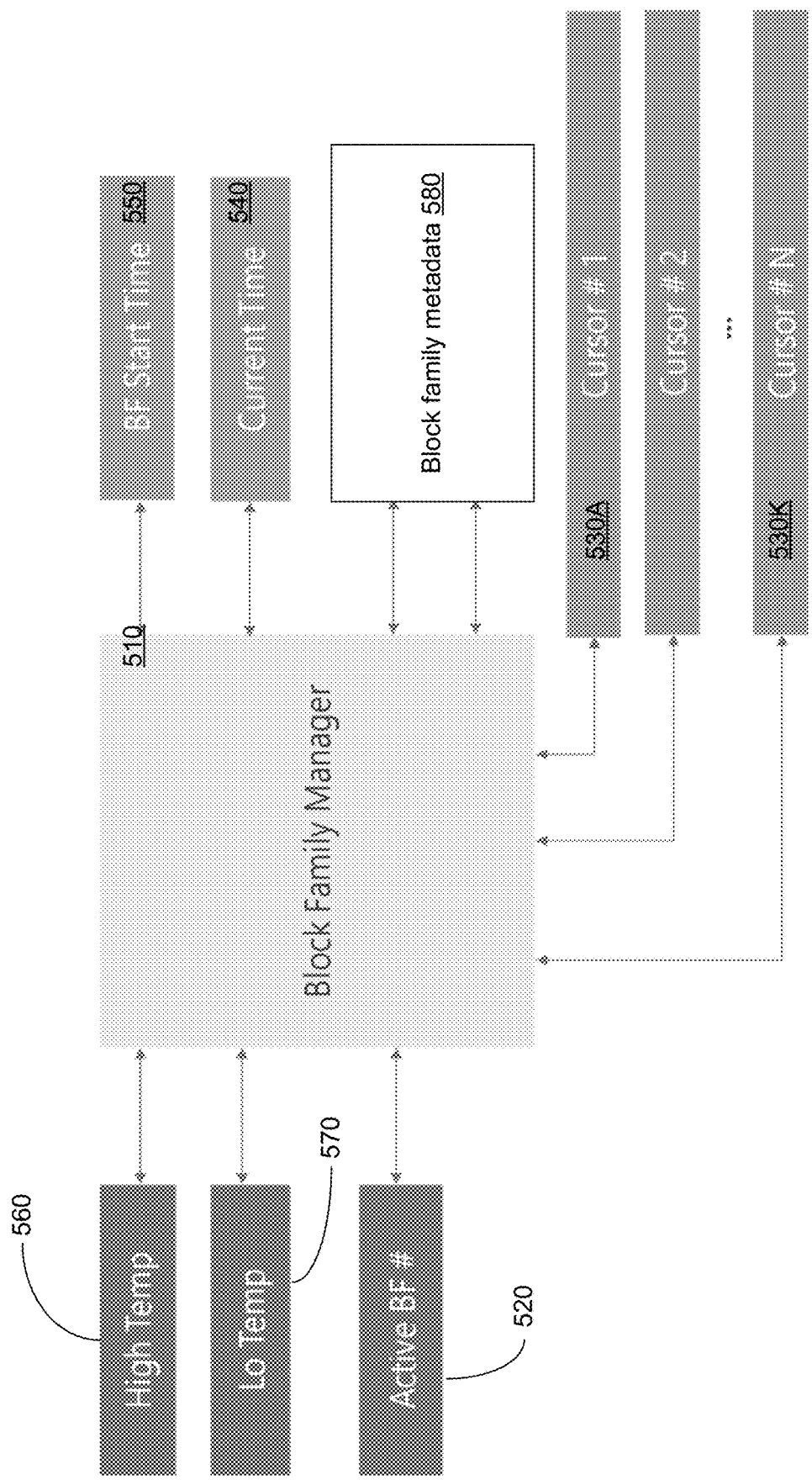
FIG. 5 schematically illustrates block family management operations implemented by the block family manager component of the memory-sub-system controller operating in accordance with embodiments of the present disclosure.

FIG. 5 schematically illustrates block family management operations implemented by the block family manager component of the memory-sub-system controller operating in accordance with embodiments of the present disclosure. As schematically illustrated by FIG. 5, the block family manager 510 can maintain, in a memory variable, an identifier 520 of the open block family, which is associated with one or more blocks of cursors 530A-530K as they are being programmed. "Cursor" herein shall broadly refer to a location on the memory device to which the data is being written.

The memory sub-system controller can utilize a power on minutes (POM) clock for tracking the creation times of block families. In some implementations, a less accurate clock, which continues running when the controller is in various low-power states, can be utilized in addition to the POM clock, such that the POM clock is updated based on the less accurate clock upon the controller wake-up from the low-power state.

Thus, upon initialization of each block family, the current time 540 is stored in a memory variable as the block family start time 550. As the blocks are programmed, the current time 540 is compared to the block family start time 550. Responsive to detecting that the difference of the current time 540 and the block family start time 550 is greater than or equal to the specified time period (e.g., a predetermined number of minutes), the memory variable storing the open block family identifier 520 is updated to store the next block family number (e.g., the next sequential integer number), and the memory variable storing the block family start time 550 is updated to store the current time 540.

The block family manager 510 can also maintain two memory variables for storing the high and low reference temperatures of a selected die of each memory device. Upon initialization of each block family, the high temperature 560 and the low temperature 570 variable store the value of the current temperature of the selected die of the memory device. In operation, while the open block family identifier 520 remains the same, temperature measurements are periodically obtained and compared with the stored high temperature 560 and the low temperature 570 values, which are updated accordingly: should the temperature measurement be found to be greater than or equal to the value stored by the high temperature variable 560, the latter is updated to store that temperature measurement; conversely, should the temperature measurement be found to fall below the value stored by the low temperature variable 570, the latter is updated to store that temperature measurement.

The block family manager 510 can further periodically compute the difference between the high temperature 560 and the low temperature 570. Responsive to determining that the difference between the high temperature 560 and the low temperature 570 is greater than or equal to a specified temperature threshold, the block family manager 510 can create a new open block family: the memory variable storing the open block family identifier 520 is updated to store the next block family number (e.g., the next sequential integer number), the memory variable storing the block family start time 550 is updated to store the current time 540, and the high temperature 560 and the low temperature 570 variables are updated to store the value of the current temperature of the selected die of the memory device.

At the time of programming a block, the memory sub-system controller associates the block with the currently open block family. The association of each block with a corresponding block family is reflected by the block family metadata 580, as described in more detail herein below with reference to FIG. 7.

As noted herein above, based on a periodically performed calibration process, the memory sub-system controller associates each die of every block family with a threshold voltage offset bin, which defines a set of threshold voltage offsets to be applied to the base voltage read level in order to perform read operations. The calibration process involves performing, with respect to a specified number of randomly selected blocks within the block family that is being calibrated, read operations utilizing different threshold voltage offsets, and choosing the threshold voltage offset that minimizes the error rate of the read operation.

Figure 6:
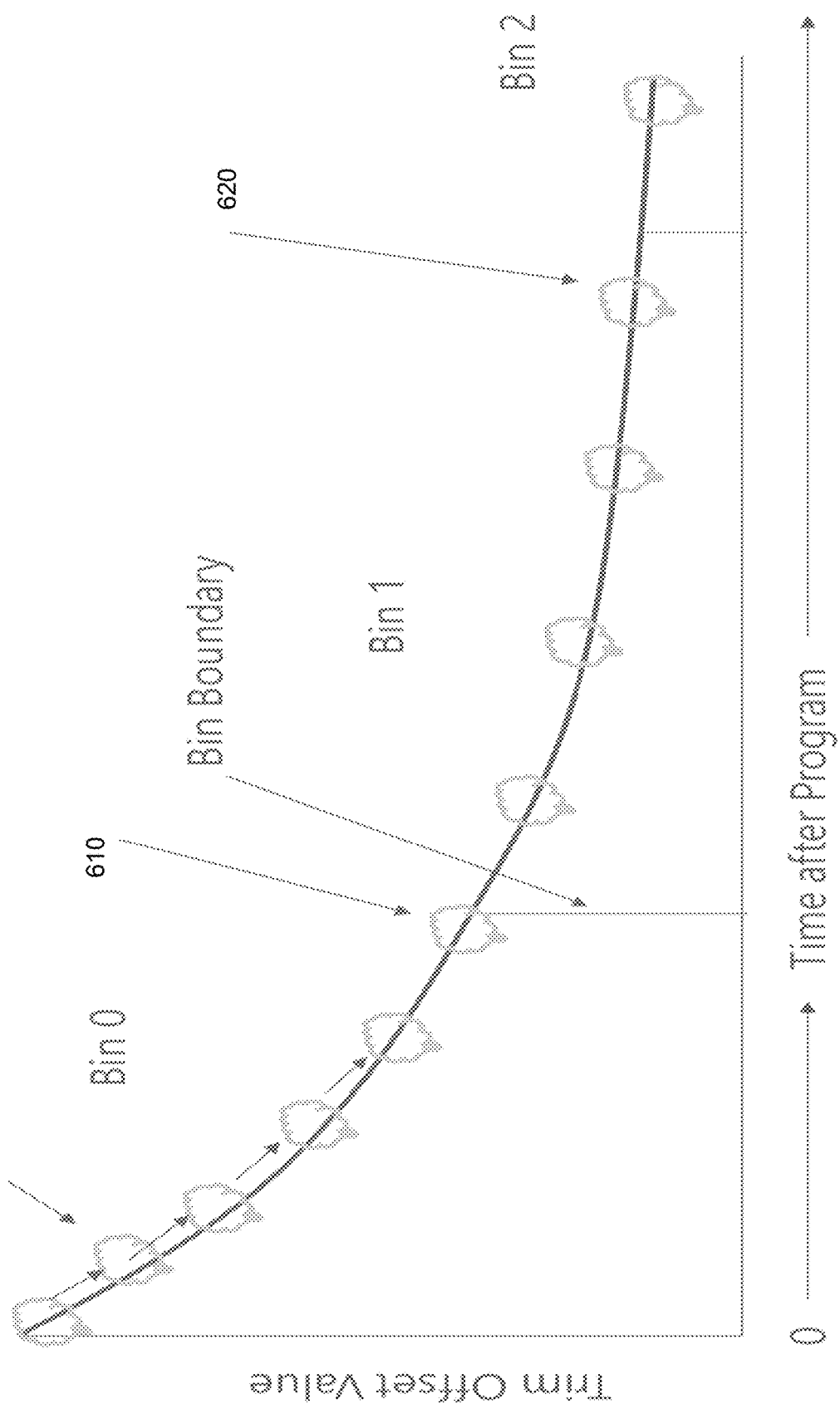
FIG. 6 schematically illustrates selecting block families for calibration, in accordance with embodiments of the present disclosure.

FIG. 6 schematically illustrates selecting block families for calibration, in accordance with embodiments of the present disclosure. As schematically illustrated by FIG. 6, the memory sub-system controller can limit the calibration operations to the oldest block family in each bin (e.g., block family 610 in bin 0 and block family 620 in bin 1), since it is the oldest block family that will, due to the slow charge loss, migrate to the next bin before any other block family of the current bin.

FIG. 7 schematically illustrates example metadata maintained by the memory sub-system controller for associating blocks and/or partitions with block families, in accordance with embodiments of the present disclosure. As schematically illustrated by FIG. 7, the memory sub-system controller can maintain the superblock table 710, the family table 720, and the offset table 730.

Each record of the superblock table 710 specifies the block family associated with the specified superblock and partition combination. In some implementations, the superblock table records can further include time and temperature values associated with the specified superblock and partition combination.

The family table 720 is indexed by the block family number, such that each record of the family table 720 specifies, for the block family referenced by the index of the record, a set of threshold voltage offset bins associated with respective dies of the block family. In other words, each record of the family table 720 includes a vector, each element of which specifies the threshold voltage offset bin associated with the die referenced by the index of the vector element. The threshold voltage offset bins to be associated with the block family dies can be determined by the calibration process, as described in more detail herein above.

Finally, the offset table 730 is indexed by the bin number. Each record of the offset table 730 specifies a set of threshold voltage offsets (e.g., for TLC, MLC, and/or SLC) associated with threshold voltage offset bin.

When combining two block families, e.g., by merging the blocks of a first block family into a second block family, then deleting the first block family, the metadata tables 710-730 can be updated as a result of combining the two block families. For example, that superblock table 710 can be updated to reflect that superblock and partition combinations of the first block family should be associated with the second block family. Similarly, the family table 720 can be updated to delete a record associated with the first block family from family table 720.

The metadata tables 710-730 can be stored on one or more memory devices 130 of FIG. 1. In some implementations, at least part of the metadata tables can be cached in the local memory 119 of the memory sub-system controller 115 of FIG. 1.

In operation, upon receiving a read command, the memory sub-system controller determines the physical address corresponding to the logical block address (LBA) specified by the read command. Components of the physical address, such as the physical block number and the die identifier, are utilized for performing the metadata table walk: first, the superblock table 710 is used to identify the block family identifier corresponding to the physical block number; then, the block family identifier is used as the index to the family table 720 in order to determine the threshold voltage offset bin associated with the block family and the die; finally, the identified threshold voltage offset bin is used as the index to the offset table 730 in order to determine the threshold voltage offset corresponding to the bin. The memory sub-system controller can then additively apply the identified threshold voltage offset to the base voltage read level in order to perform the requested read operation.

In the illustrative example of FIG. 7, the superblock table 710 maps partition 0 of the superblock 0 to block family 4, which is utilized as the index to the family table 720 in order to determine that die 0 is mapped to bin 3. The latter value is used as the index to the offset table in order to determine the threshold voltage offset values for bin 3.

Figure 8:
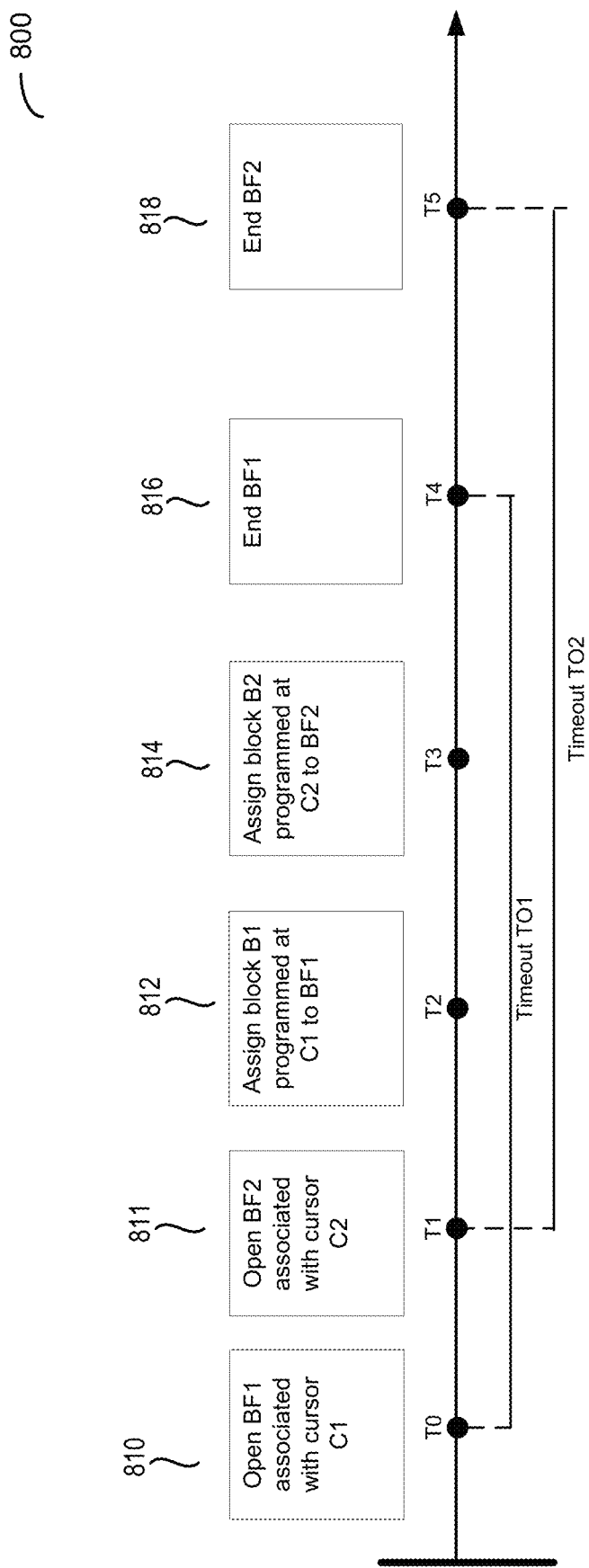
FIG. 8 depicts a sequence diagram illustrating the flow of events for an example method 800 of maintaining multiple open block families for supporting multiple cursors of a memory sub-system, in accordance with one or more aspects of the present disclosure.

FIG. 8 depicts a sequence diagram illustrating the flow of events for an example method 800 of maintaining multiple open block families for supporting multiple cursors of a memory sub-system, in accordance with one or more aspects of the present disclosure. Method 800 may be performed by processing logic that includes hardware (e.g., circuitry, dedicated logic, programmable logic, microcode, etc.), software (e.g., instructions run on a processor to perform hardware simulation), or a combination thereof. In some embodiments, the method 800 is performed by block family management component 113 of FIG. 1.

Method 800 opens at operation 810. At operation 810 the processing logic at time T0 opens a new block family BF1 and assigns a cursor C1 to BF1. In implementations, cursor C1 can be associated with a data stream having a specific set of characteristics, e.g., performance characteristics, workload characteristics, garbage collection characteristics or a combination thereof. As explained in more details herein. Upon opening block family BF1, the processing logic can assign a timeout value TO1 to BF1, indicating a time period after which block family BF1 can be closed.

At operation 811, the processing logic opens another block family BF2 at time T1 and assigns cursor C2 to BF2. In one implementation, the processing logic can open a new block family BF2 upon determining that the data stream set of characteristics associated with cursor C2 are different than the data stream set of characteristics associated with cursor C1. For example, the processing logic can determine that the data stream associated with C1 has different performance, workload, and/or garbage collection characteristics than those of the data stream associated with cursor C1. Accordingly, the processing logic can determine that C2 can be assigned to a separate block family and can open block family BF2 that can be calibrated independently than BF1 that is associated with C1. Additionally, upon opening block family BF2, the processing logic can assign a timeout value TO2 to BF2, indicating the time period after which block family BF2 can be closed. In one implementation, TO2 and TO1 can have the same value. In another implementation, TO1 and TO2 can have different values that can be determined based on the characteristics of the data stream associated with each block family, for example.

At operation 812, the processing logic at time T2 can detect that block B1 is programmed at cursor C1. The processing logic can then assign B1 to block family BF1 that is associated with C1. The processing logic can further assign subsequent blocks that are programmed at cursor C1 to BF1 until BF1 is no longer an open block family in the memory sub-system (e.g., has ended after the expiration of its timeout value).

Similarly, at operation 814, the processing logic at time T3 can detect that block B2 is programmed at cursor C2. The processing logic can then assign B2 to block family BF2 that is associated with C2. The processing logic can further assign subsequent blocks that are programmed at cursor C2 to BF2 has ended.

At operation 816, the processing logic at time T4 ends BF1. In certain implementations, the processing logic ends BF1 irrespective of how many other block families are open in the memory sub-system. As an example, the processing logic can end BF1 at T4 upon determining that a timeout TO1 that is associated with BF1 has expired. In an implementation, upon ending BF1, the processing logic can open a new block family (e.g., BF3) and can assign cursor C1, and other cursors associated with BF1, to block family BF3.

At operation 818, the processing logic at time T5 ends BF2. Similar to ending BF1, the processing logic ends BF2 when a timeout value of TO2 that is associated with BF2 has expired, regardless of the status of the other open block families in the memory sub-system. In an implementation, upon ending BF2, the processing logic can open a new block family (e.g., BF4) and can assign cursor C2, and other cursors associated with BF2, to block family BF4.

Figure 9:
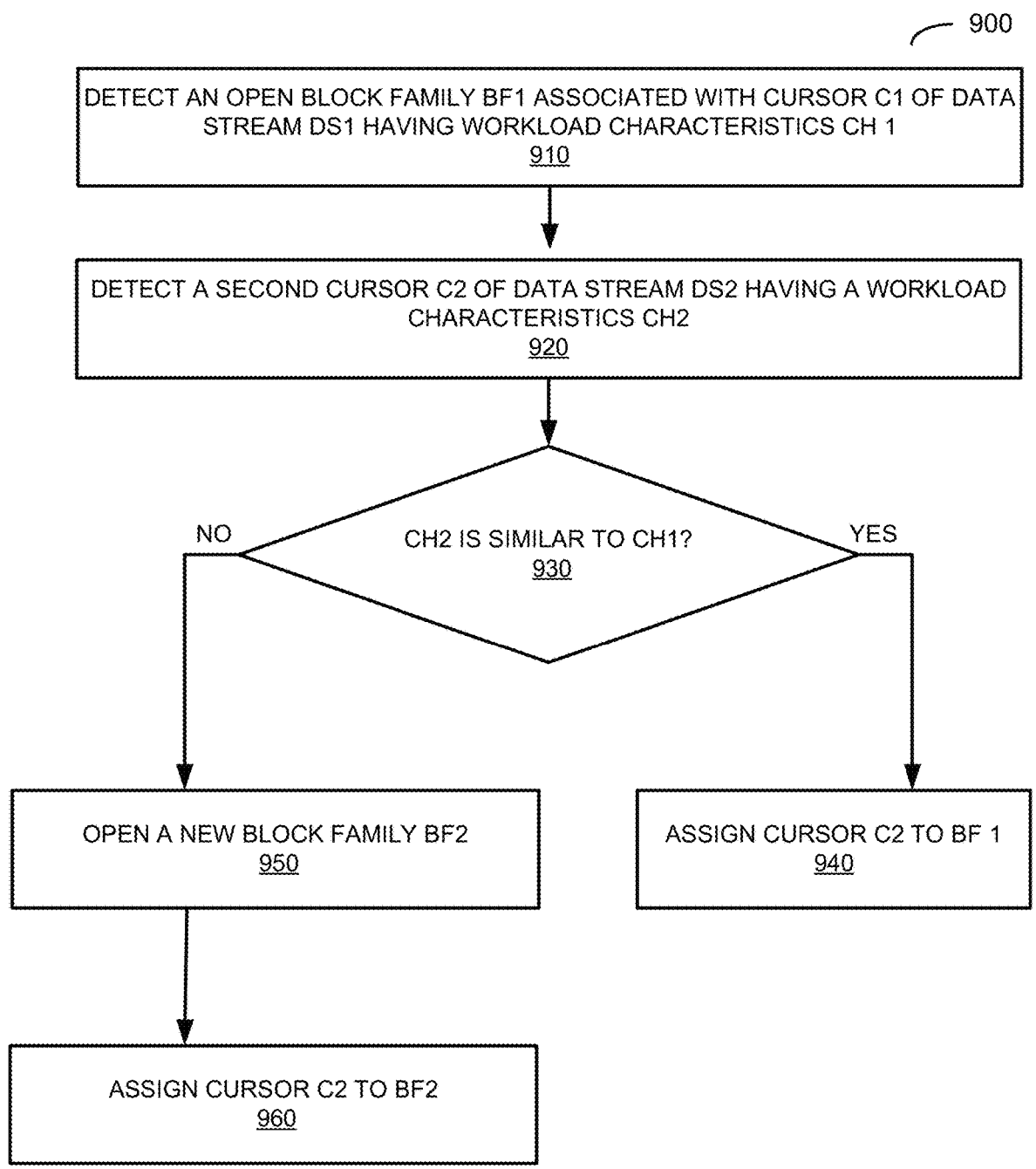
FIG. 9 is a flow diagram of an example method of opening a new block family based on characteristics of cursors in a memory sub-system, in accordance with some embodiments of the present disclosure.

FIG. 9 is a flow diagram of an example method of opening a new block family based on characteristics of cursors in a memory sub-system, in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the block family management component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 910, the processing logic detects a block family BF1 currently open in the memory sub-system. The processing logic can further detect, e.g., using a metadata table of the memory sub-system, that BF1 is associated with a cursor C1 of a data stream DS1. The data stream DS1 has certain workload characteristics CH1. In one implementation, the workload characteristics refers to the frequency or read and write operations and a payload size of read and write operations.

At operation 920, the processing logic detects a second cursor C2 that is associated with a second data stream DS2. Similar to DS1, DS2 can have a certain workload characteristics CH2, representing payload size and/or frequency of read and write operations performed for data stream DS2. At operation 930, the processing logic can make a determination whether or not CH1 of DS1 is similar to CH2 of DS2. For example, if the difference between the frequency of the read and write operations of DS1 is within a predetermined variance from the frequency of the read and write operations of DS2, then the CH2 and CH1 are similar. In another example, the processing logic can determine that CH1 and CH2 are similar if the average payload size of read/write operations of DS1 is within a predetermined variance from the average payload size of read/write operations of DS2.

At operation 940, when the processing logic determines that CH1 and CH2 are similar, the processing logic can assign cursor C2 to the already open block family BF1. Because data streams DS 1 and DS2 have similar characteristics, blocks that are programmed at DS1 or DS2 can be assigned to the same block family because they are likely to have similar threshold voltage offsets, thus the same calibration process of BF1 can be applied to blocks of either DS1 or DS2.

On the other hand, when the processing logic determines that CH1 and CH2 are not similar, the processing logic at 950 can open a new block family BF2. At operation 960, can assign cursor C2 to block family BF2 in order to maintain a separate threshold voltage offsets for each cursor based on the characteristics of each data stream associated with each cursor, as explained in more details herein above.

Figure 10:
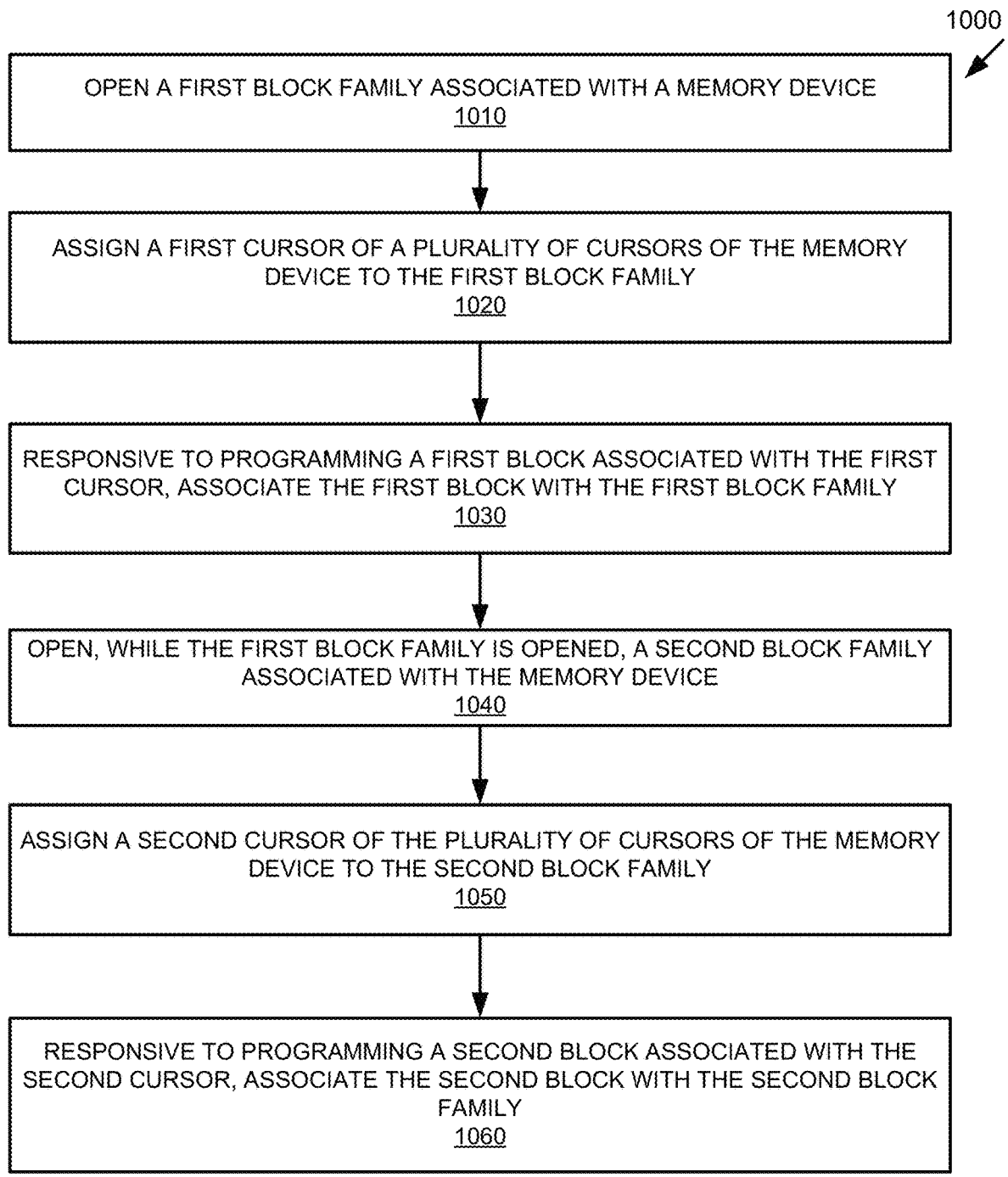
FIG. 10 is a flow diagram of an example method of enabling multiple open block families supporting multiple cursors in a memory sub-system, in accordance with some embodiments of the present disclosure.

FIG. 10 is a flow diagram of an example method of enabling multiple open block families supporting multiple cursors in a memory sub-system, in accordance with some embodiments of the present disclosure. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by the block family management component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 1010, the processing logic opens a new block family associated with a memory device. In implementations, opening a new block family includes assigning the block family as a currently open block family within the memory sub-system for a certain period of time, as explained in more details herein.

At operation 1020, the processing logic assigns a certain cursor from a group of cursors associated with the memory sub-system to the opened block family. In an implementation, assigning a cursor to the block family can result in assigning blocks that are programmed at the cursor to the block family.

At operation 1030, when the processing logic determines that a block is programmed at the cursor assigned to the block family, the processing logic can associate the block with the block family, for example, by inserting a record associating the block with the block family in a metadata table of the memory sub-system.

At operation 1040, the processing logic opens another block family associated with the memory device. In one implementation, the processing logic can open another block family, in addition to the currently open block family, upon determining that another cursor of the memory sub-system is associated with a different set of characteristics than the first cursor that is assigned to the open block family, as explained in more details herein above.

At operation 1050, the processing logic assigns the second cursor from the group of cursors associated with the memory sub-system to the second block family. At operation 1060, when the processing logic determines that a second block is programmed at the second cursor that is assigned to the second open block family, the processing logic can associate the second block with the second block family, for example, by inserting a record associating the second block with the second block family in the metadata table of the memory sub-system.

Figure 11:
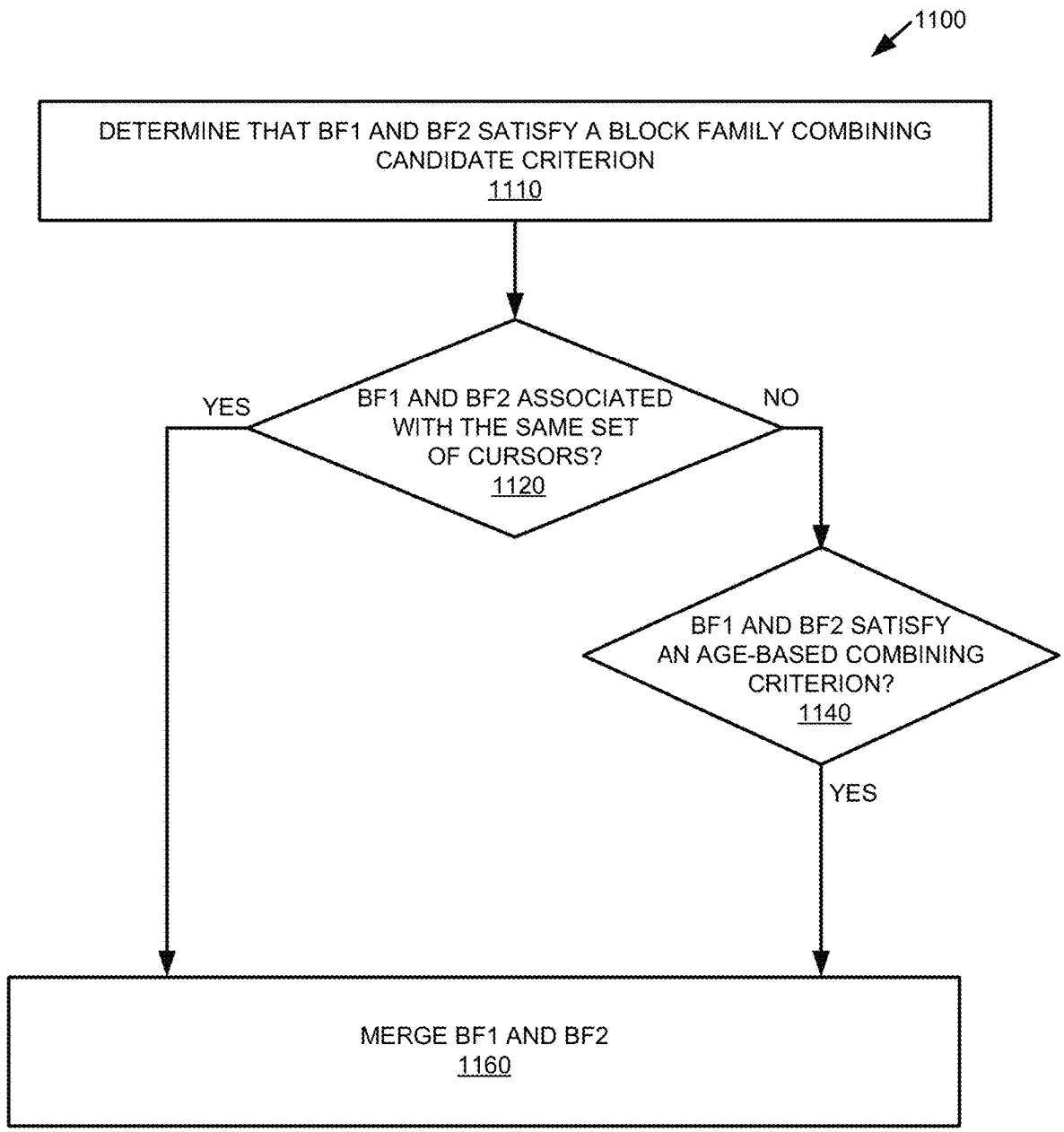
FIG. 11 is a flow diagram of an example method of combining block families based on associated cursors and/or age combining criterion in a memory sub-system, in accordance with some embodiments of the present disclosure.

FIG. 11 is a flow diagram of an example method of combining block families based on associated cursors and/or age combining criterion in a memory sub-system, in accordance with some embodiments of the present disclosure. The method 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by the block family management component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 1110, the processing logic determines that two block families, BF1 and BF2 of a memory device satisfy a block family combining candidate criterion. In implementations, the block family combining candidate criterion can be determining that the two block families have similar threshold voltage offset. It the two block families satisfy the combining candidate criterion, the two block families can be combined if additional criteria are met, for example, if the two block families are associated with the same set of cursors.

At operation 1120, the processing logic determines whether BF1 and BF2 are associated with the same set of cursors. In another implementation, the processing logic can determine whether at least a subset of the cursors associated with BF1 are also associated with BF2. If BF1 and BF2 are associated with at least a subset of cursors, the processing logic at operation 1160 can combine BF1 and BF2 by merging blocks associated with BF1 into BF2 and then deleting BF1.

On the other hand, if the processing logic determines that BF1 and BF2 are not associated with the same set of cursors (or that they are not associated with common cursors), the processing logic can, at operation 1140, can determine whether or not BF1 and BF2 satisfy an age-based criterion by determining whether or not BF1 and BF2 are older than a certain age threshold. In this case, because block families converge in characteristics as time passes even when supporting different data streams, the processing logic can combine BF1 and BF2, at operation 1160, when the age of each of each of BF1 and BF2 is equal to or exceeds the predetermined age threshold.

Figure 12:
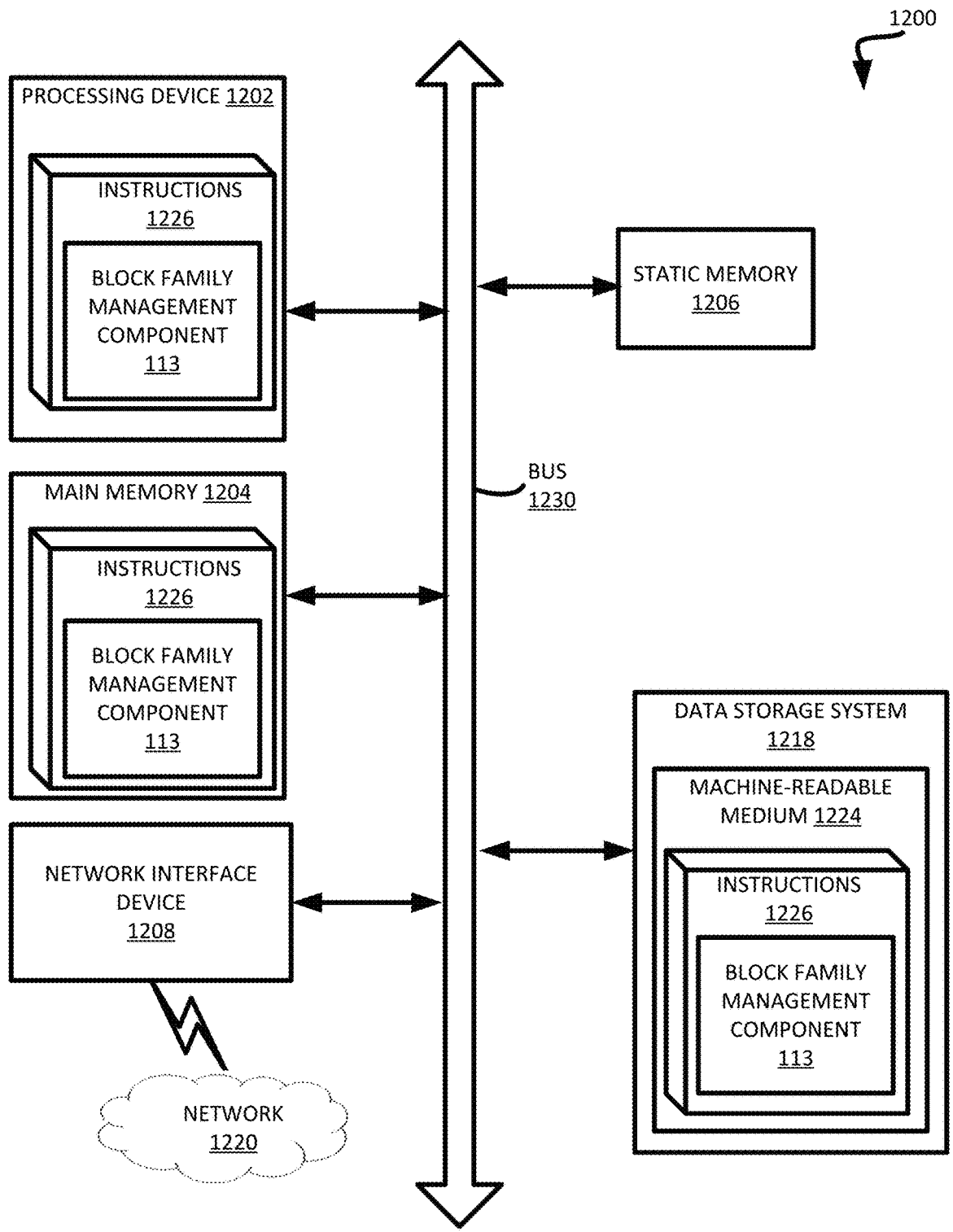
FIG. 12 is a block diagram of an example computer system in which embodiments of the present disclosure can operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to block family management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory sub-system 110 of FIG. 1.

In one embodiment, the instructions 1226 include instructions to implement functionality corresponding to block family management component 113 of FIG. 1. While the machine-readable storage medium 1224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, to perform operations comprising:
opening a first block family associated with the memory device;
assigning a first cursor of a plurality of cursors of the memory device to the first block family;
responsive to programming a first block associated with the first cursor, associating the first block with the first block family;
opening, while the first block family is open, a second block family associated with the memory device;
assigning a second cursor of the plurality of cursors of the memory device to the second block family; and
responsive to programming a second block associated with the second cursor, associating the second block with the second block family,
wherein each cursor of the plurality of cursors of the memory device is associated with a respective data stream associated with a respective set of characteristics, and
wherein the respective set of characteristics comprises at least one of a performance requirement of the data stream, a workload of the data stream, or expected garbage collection parameter of the data stream.

2. The system of claim 1, wherein the operations further comprises:
responsive to opening the first block family, initializing a first timeout associated with the first block family; and
responsive to detecting expiration of the first timeout, ending the first block family.

3. The system of claim 2, wherein the operations further comprises:
responsive to opening the second block family, initializing a second timeout associated with the second block family, wherein the second timeout is different than the first timeout; and
responsive to detecting expiration of the second timeout, ending the second block family.

4. The system of claim 1, wherein the first cursor is associated with a first data stream and the second cursor is associated with a second data stream, wherein a first set of characteristics of the first data stream is different than a second set of characteristics of the second data stream, wherein a distance between a first vector corresponding to a first set of characteristics of the first data stream and a second vector corresponding to a second set of characteristics of the second data stream exceeds a threshold.

5. The system of claim 1, wherein the operations further comprises:
detecting that a third cursor of the plurality of cursors is associated with a first data stream;
responsive to determining that a first set of characteristics of the first data stream are similar to a second set of characteristics of a second data stream associated with the first cursor, assigning the third cursor to the first block family, wherein determining that the first set of characteristics and the second set of characteristics are similar comprises determining that a distance between a first vector corresponding to the first set of characteristics and a second vector corresponding to the second set of characteristics does not exceed a threshold.

6. The system of claim 1, wherein the operations further comprises:
merging the first block family and a third block family, wherein the first block family is associated with a set of cursors and the third block family is associated with the set of cursors.

7. A method comprising:
detecting a first open block family associated with a memory device, the first open block family associated with a first cursor of a plurality of cursors of the memory device; and
responsive to determining that a second cursor of the plurality of cursors is associated with a first set of characteristics that are different than a second set of characteristics associated with the first cursor:
opening a second block family associated with the memory device; and
assigning the second cursor of the plurality of cursors to the second block family,
wherein each cursor of the plurality of cursors of the memory device is associated with a respective data stream, the respective data stream associated with a respective set of characteristics, and
wherein the respective set of characteristics of the respective data stream comprises at least one of performance requirements of the data stream, workload of the data stream, or expected garbage collection of the data stream.

8. The method of claim 7 further comprising:
responsive to detecting expiration of a timeout associated with the first open block family, ending the first open block family.

9. The method of claim 7 further comprising:
detecting that a third cursor of the plurality of cursors is associated with a first data stream;
responsive to determining that a third set of characteristics of the first data stream are similar to the second set of characteristics associated with the first cursor, assigning the third cursor to the first block family, the second set of characteristics associated with a second data stream.

10. The method of claim 7 further comprising:
merging the first block family and a third block family, wherein the first block family is associated with a set of cursors and the third block family is associated with the set of cursors.

11. A non-transitory computer-readable storage medium comprising instructions that, when executed by a processing device, cause the processing device to:

open a first block family associated with the memory device;
assign a first cursor of a plurality of cursors of the memory device to the first block family;
responsive to programming a first block associated with the first cursor, associate the first block with the first block family;
open, while the first block family is open, a second block family associated with the memory device;
assign a second cursor of the plurality of cursors of the memory device to the second block family; and
responsive to programming a second block associated with the second cursor, associate the second block with the second block family,
wherein each cursor of the plurality of cursors of the memory device is associated with a respective data stream, the respective data stream associated with a respective set of characteristics, and
wherein the respective set of characteristics of the respective data stream comprises at least one of performance requirements of the data stream, workload of the data stream, or expected garbage collection of the data stream.

12. The non-transitory computer-readable storage medium of claim 11, wherein the processing device is further to:
responsive to opening the first block family, initialize a first timeout associated with the first block family; and
responsive to detecting expiration of the first timeout, end the first block family.

13. The non-transitory computer-readable storage medium of claim 11, wherein the processing device is further to:
responsive to opening the second block family, initialize a second timeout associated with the second block family, wherein the second timeout is different than the first timeout; and
responsive to detecting expiration of the second timeout, end the second block family.

14. The non-transitory computer-readable storage medium of claim 11, wherein the first cursor is associated with a first data stream and the second cursor is associated with a second data stream, wherein a first set of characteristics of the first data stream is different than a second set of characteristics of the second data stream.

* * * * *